M. HALLENBECK.
Mowing Machine.
No. 10,802.  Patented April 18, 1854.
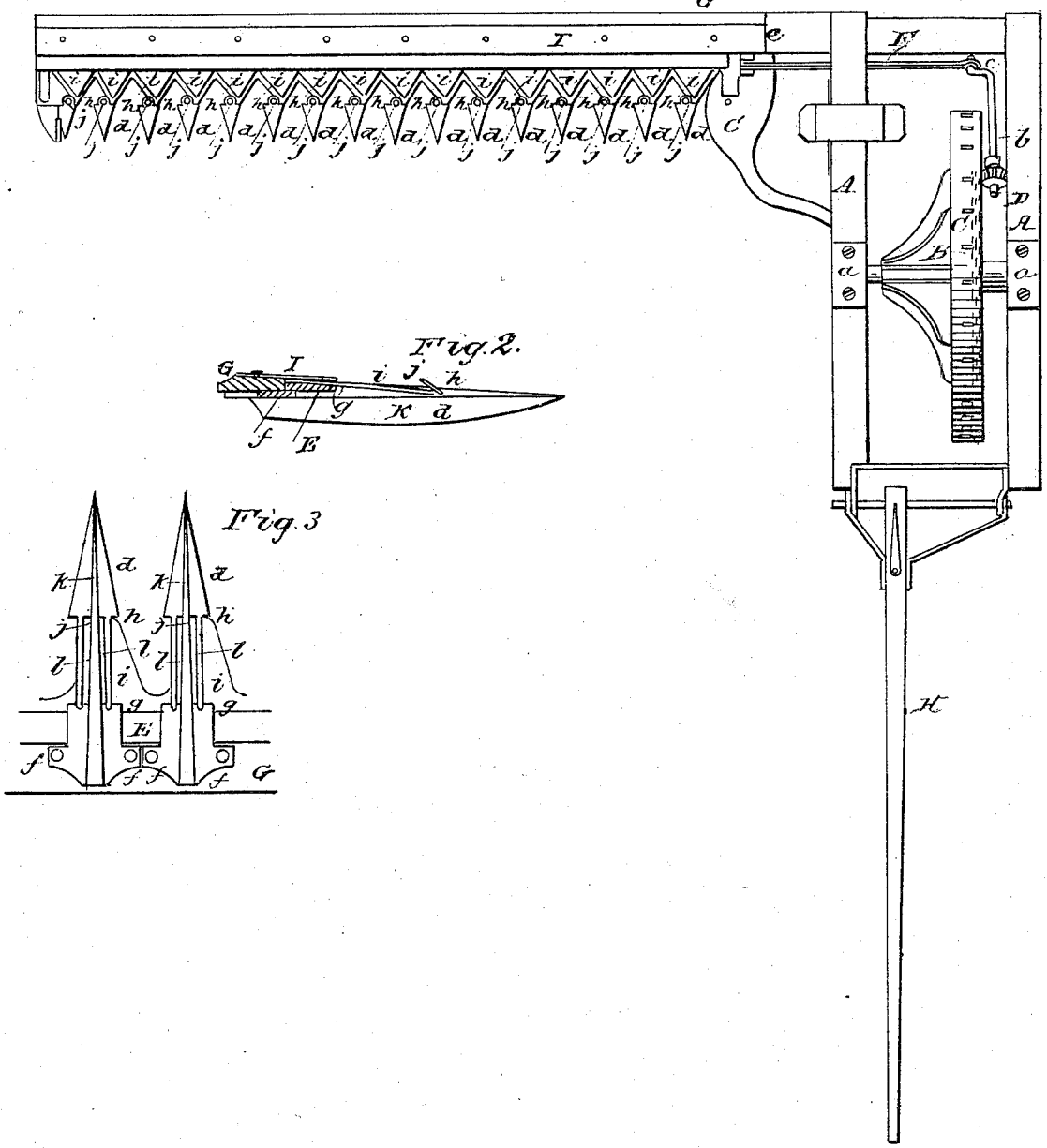

UNITED STATES PATENT OFFICE.

MARTIN HALLENBECK, OF ALBANY, NEW YORK.

IMPROVEMENT IN GRASS-HARVESTERS.

Specification forming part of Letters Patent No. 10,802, dated April 18, 1854.

*To all whom it may concern:*

Be it known that I, MARTIN HALLENBECK, of the city and county of Albany, and State of New York, have invented certain new and useful Improvements in Mowing-Machines; and I do hereby declare that the following is a full, clear, and exact description of the same, reference being had to the annexed drawings, making part of this specification, in which—

Figure 1 is a plan or top view of my improved mowing-machine. Fig. 2 is a side view of one of the fingers, showing the manner in which the fingers are attached to the heel-bar, and also the manner in which the sickle-bar is secured on the upper surfaces of the fingers, the sickle-bar and heel-bar being bisected transversely. Fig. 3 is an under view of two of the fingers. In this view a portion of the sickle-bar and heel-bar are shown.

Similar letters of reference indicate corresponding parts in the several figures.

This invention relates to certain new and useful improvements in mowing-machines; and it consists in a peculiar construction of the fingers, whereby the grass is prevented from being forced out from the fingers when acted upon by the sickle, and the recesses in the fingers are also prevented from being clogged or filled with dirt.

To enable others skilled in the art to make and use my invention, I will proceed to describe its construction and operation.

A represents a rectangular frame, in which the driving-wheel B is placed, the axis of the wheel B running in suitable boxes or bearings, $a\,a$, on the side pieces of the frame. (See Fig. 1.) The driving-wheel B has a bevel-toothed wheel, C, attached to its arms, and concentric with the driving-wheel, and a small bevel-pinion, D, gears into the bevel-wheel C.

To the outer end of the shaft $b$ of the pinion D there is a crank, $c$, to which a sickle-bar, E, is connected by a connecting-rod, F. The sickle-bar will hereinafter be more particularly referred to.

G is a heel-bar, to which fingers $d$ are attached. The heel-bar is secured to the frame A by means of curved metal braces $e\,e$, which extend downward from the frame A sufficiently to bring the heel-bar G near to the surface of the ground. The braces $e\,e$ are secured to the back part of the frame A, as shown in Fig. 1, and the heel-bar is consequently placed on a line back of the driving-wheel B.

H is the draft-pole, attached to the front end of the frame A and out of line with the driving-wheel B, as shown in Fig. 1, the pole being nearest the side of the frame to which the heel-bar is attached.

The fingers $d$ are bolted or screwed to the under surface of the heel-bar G, as shown in Fig. 3, the said fingers being provided at their back ends with flanges or projections $f\,f$, one on each side, through which the bolts or screws pass. Some distance ahead of the flanges $f$ a lip, $g$, is formed on the fingers, and between the lips $g$ on the fingers and the front edge of the heel-bar G the sickle-bar E is placed. (See Figs. 2 and 3.) Outward from the lips $g$ the upper surfaces of the fingers $d$ are slightly inclined downward, the inclination terminating at a ledge, $h$. (See Fig. 2.) The teeth $i$ of the sickle work over the inclined surfaces of the fingers, between the lips $g$ and ledges $h$, as shown in Figs. 2 and 3, the said teeth being secured to the sickle-bar E. From each ledge $h$ there projects in a direction toward the heel and sickle bars an inclined plate or guide, $j$, terminating in a point, as more particularly shown in Figs. 1 and 2. These plates are at their bases of the same width as the fingers, which, from ledges $h$, gradually terminate in points, as shown in Figs. 1 and 3. Between the lips $g$ and the ledges $h$ the fingers are rather narrower than the width of the lips and ledges, as shown clearly in Fig. 3, and a longitudinal rib, $k$, extends downward from the center of the bottom of each finger, the bottom of the rib being curved similar to the iron of a skate or the keel of a boat. On each side of the ribs $k$, and through the parts of the fingers between the lips $g$ and ledges $h$, vertical slots $l$ are cut—two slots through each finger, as shown in Fig. 3.

I is a metal plate, which is screwed or bolted to the upper surface of the heel-bar G, the front edge of the plate bearing upon the bases of the teeth $i$ of the sickle and keeping the sickle firmly in its place.

Operation: As the machine is drawn along, the resistance which the grass offers to the sickle is counteracted by the line of draft, the pole H being attached to the frame near the side to which the heel-bar G is attached. The machine consequently will move steadily along, and the pole will not bear heavily upon the team, as it would if the pole were attached to the frame A in line with the wheel. The grass, as the machine moves along, passes between the fingers $d$, and the teeth $i$ of the sickle, which have a reciprocating motion communicated to them by means of the crank $c$ and connecting-rod F, cut the grass as they work over the fingers, the said grass being cut against the fingers between lips $g$ and ledges $h$. The plates $j$ prevent the teeth, when working, from forcing the grass outward from the fingers. They have a tendency to throw the grass inward or toward the heel-bar, and as the ledges $h$ project a little distance beyond each side of the parts of the fingers where the grass is cut, the grass by this means is also prevented from being forced outward from the fingers by the action of the teeth. The moisture and gummy substance in the grass are prevented from accumulating upon the fingers and clogging the sickle by means of the slots $l$, the moisture passing downward through the slots; and the slots are prevented from clogging or filling by means of the ribs $k$, which rest upon the ground, and thereby prevent the lower parts of the slots from coming in contact with the ground. The plate I keeps the sickle firmly in its place, and as the front edge of the plate only rests or bears upon the teeth, not much friction is created by it.

Having thus described my invention, what I claim as new, and desire to secure by Letters Patent, is—

The peculiar construction of the fingers $d$, as herein shown and described—viz., having ribs $k$ at the lower parts of the fingers, and vertical slots $l\ l$ passing through the fingers on each side of the ribs, and inclined plates $j$, attached to the fingers, and ledges $h$ at each side, the plates $j$ preventing the sickle from clogging, and the ledges $h$ preventing the grass from being thrown out from the fingers by the action of the teeth.

MARTIN HALLENBECK.

Witnesses:
S. H. WALES,
JNO. W. HAMILTON.